A. C. CREHORE.
SYNCHRONIZING MEANS FOR ELECTRICAL APPARATUS.
APPLICATION FILED JULY 17, 1903.
913,363.
Patented Feb. 23, 1909.
4 SHEETS—SHEET 1.
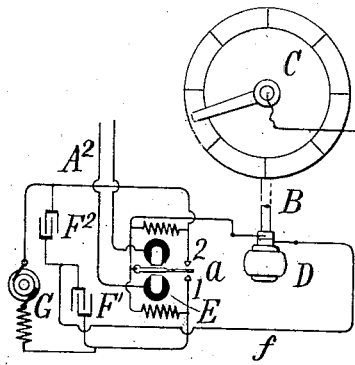
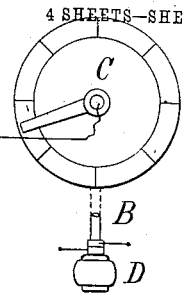
*Fig. 1*
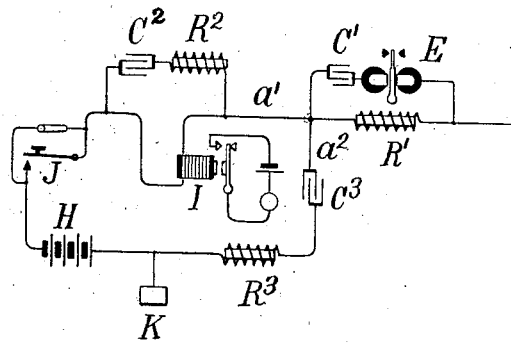
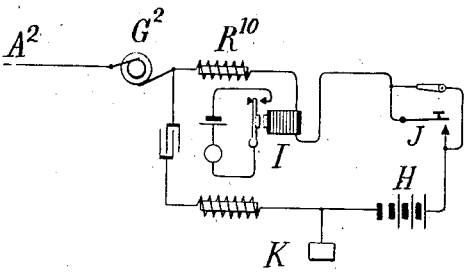
*Fig. 2*
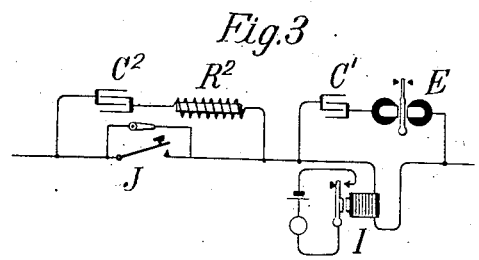
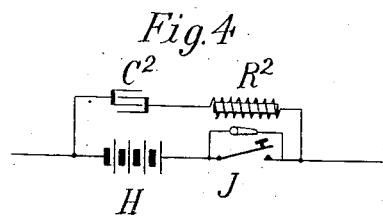
*Fig. 3*     *Fig. 4*
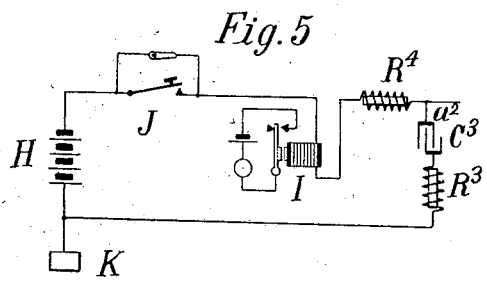
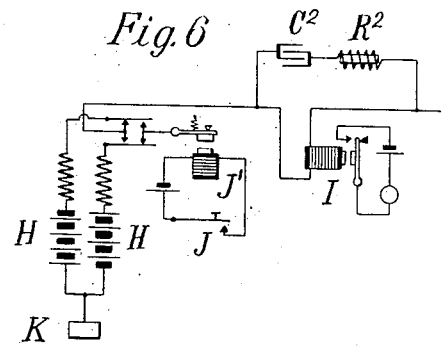
*Fig. 5*     *Fig. 6*
Witnesses:
Raphaël Petter
L. T. Shaw
Inventor
Albert C. Crehore
by E. M. Brewster Att'y A. C. CREHORE.
SYNCHRONIZING MEANS FOR ELECTRICAL APPARATUS.
APPLICATION FILED JULY 17, 1903.
913,363.
Patented Feb. 23, 1909.
4 SHEETS—SHEET 2
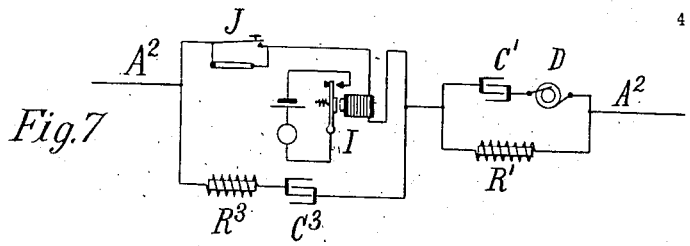
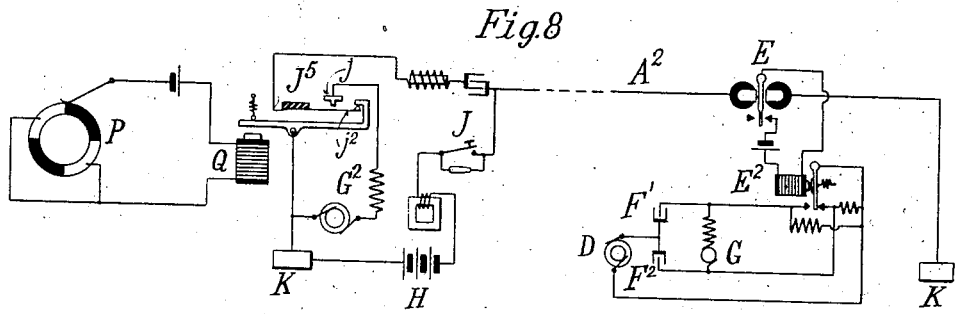
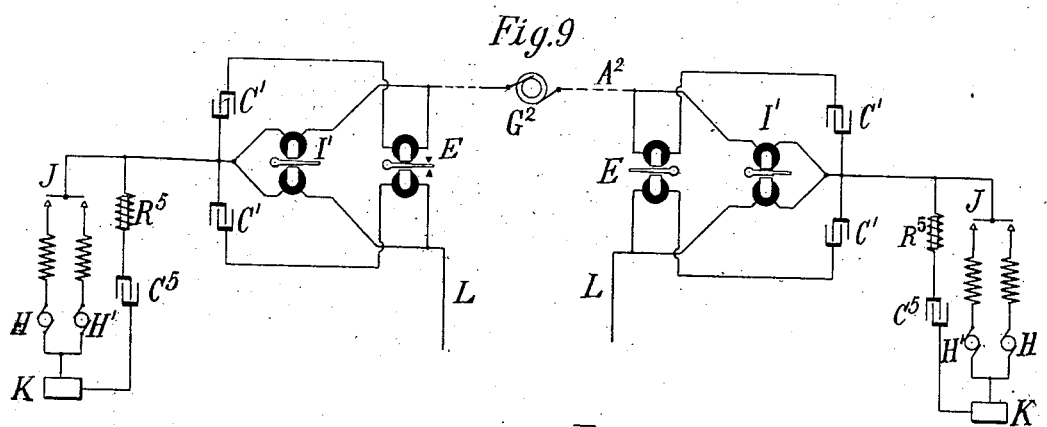
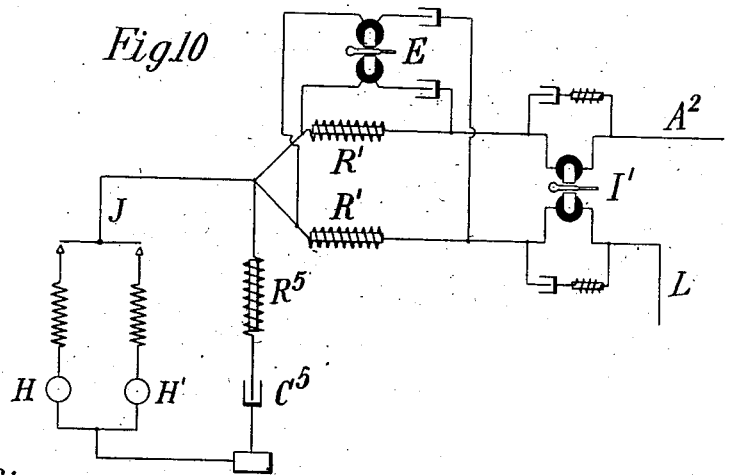
Witnesses:
Raphaël Netter
L. T. Shaw
Inventor
Albert C. Crehore
by E. M. Bentley Att'y A. C. CREHORE.
SYNCHRONIZING MEANS FOR ELECTRICAL APPARATUS.
APPLICATION FILED JULY 17, 1903.
913,363.
Patented Feb. 23, 1909.
4 SHEETS—SHEET 3.
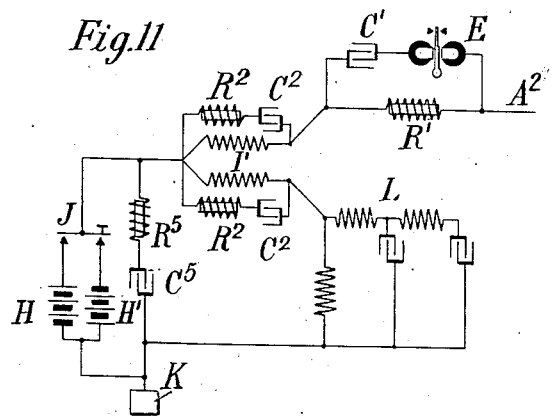
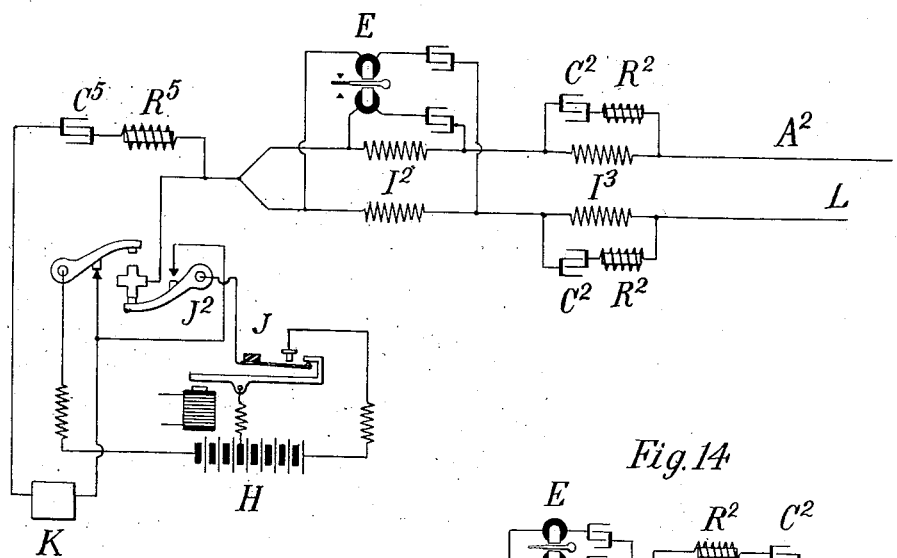
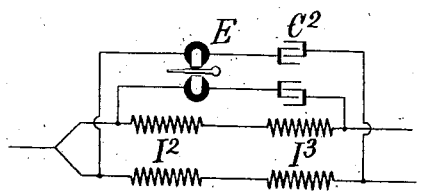
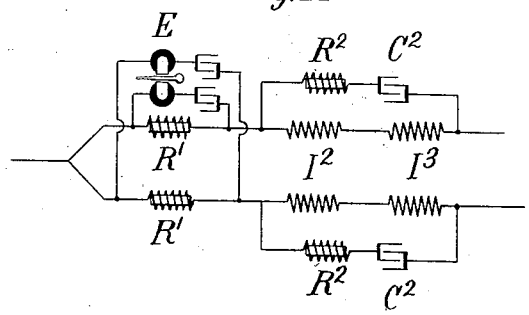
Witnesses:
Raphaël Netter
L. T. Shaw
Inventor
Albert C. Crehore
by E. M. Bentley Atty

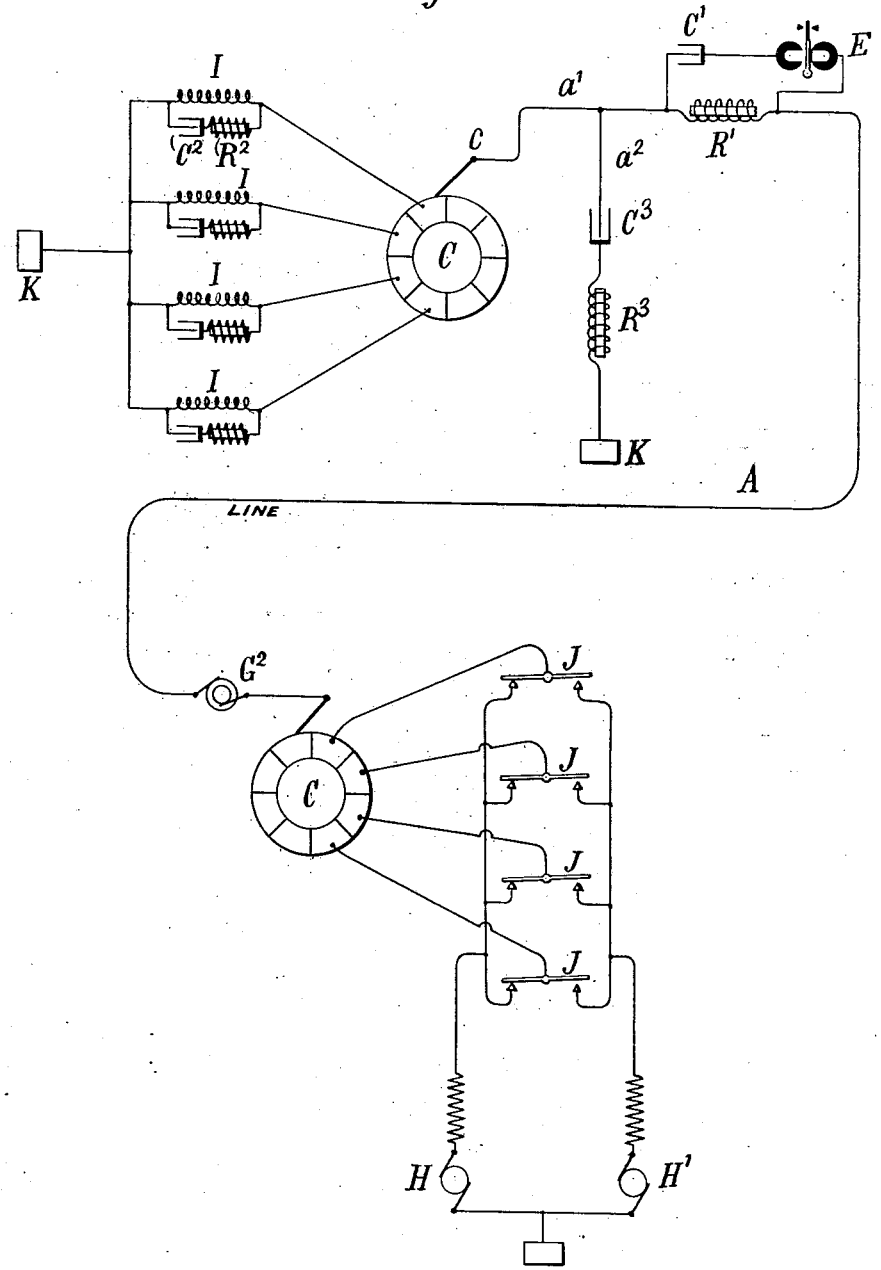

UNITED STATES PATENT OFFICE.

ALBERT C. CREHORE, OF YONKERS, NEW YORK.

SYNCHRONIZING MEANS FOR ELECTRICAL APPARATUS.

No. 913,363.  Specification of Letters Patent.  Patented Feb. 23, 1909.

Application filed July 17, 1903. Serial No. 165,927.

*To all whom it may concern:*

Be it known that I, ALBERT C. CREHORE, a citizen of the United States, residing at Yonkers, county of Westchester, and State of New York, have invented certain new and useful Improvements in Synchronizing Means for Electrical Apparatus; and in pursuance of the statute I have set forth in the accompanying drawing and specification as an illustration of the invention that form thereof which I now regard as the best one of the various forms in which the principle of the invention may be embodied.

In the drawings, Figure 1 shows diagrammatically a telegraph line with synchronous multiplex apparatus thereon to be controlled according to my invention. Fig. 2 shows diagrammatically the elementary principles of my invention as illustrated by its application to a single Morse line. Figs. 3-8 show variations in the embodiment of the invention. Figs. 9, 10 and 11 show the application of the synchronizing devices to a duplex line. Figs. 12-14 show their application to a quadruplex line. Fig. 15 shows the application of the synchronizing devices to the line containing the apparatus to be synchronized.

Certain kinds of electrical apparatus such as multiplex telegraphs employ electro-magnetic devices at different points which need to work in exact synchronism with one another, and the object of my invention is to provide means whereby special synchronizing electrical impulses may be transmitted over a line without interference with other transmission that may take place on the same or another line at the same time.

I usually employ an alternating current for the synchronizing function, its impulses being transmitted continuously over an intact circuit, while other circuits utilizing the same line wire may be made and broken or otherwise operated at will without disturbing or being disturbed by the synchronizing current. Such other circuits may include telegraph apparatus such as that of the ordinary Morse type, either single or multiplex, and they may include the particular synchronous multiplex telegraph to which the synchronizing impulses are applied, or other apparatus fitted to the situation. I may, however, use direct current impulses, either reversed or not, to give the synchronizing effect in certain cases.

I also include as a part of my invention that special embodiment of its fundamental features wherein the synchronizing impulses are applied to a line, distinct from that on which the apparatus to be controlled is situated, but still containing other apparatus in circuits that remain independent of the circuits on the same line, in which my synchronizing devices operate.

To illustrate the principles of my invention I have shown, as one of its different embodiments, a synchronous multiplex telegraph system operating on a line wire, and, for securing the synchronism of the different instruments, the synchronizing impulses aforesaid are applied on a second wire which also carries the circuits of an ordinary Morse telegraph system. By "circuits" I mean the conducting routes or combinations of routes pertaining to the respective classes of apparatus, there being on the same line or wire, and at the same time, different currents for which different circuits, appropriate to the respective currents, are provided. The line wire will thus be included in different circuits being the common medium utilized by all of the different currents as a portion of their respective circuits.

I have also shown various modes of applying the synchronizing devices to Morse circuits, and have, in addition, shown, but without making specific claim to it in the present application, how such devices may be applied on the multiplex or controlled line itself, instead of on a separate line.

My invention so far as it applies to synchronous multiplex telegraphy is not limited to any particular system of that class, but is applicable to any system which is dependent upon synchronous movement of the respective instruments, and in which it is desirable to insure such synchronism by means of the supplemental appliances which form one feature of the present application.

Turning to the accompanying drawings, I have indicated in Fig. 1 thereof a multiplex telegraph line A having at different stations thereon synchronous telegraphing apparatus which I have indicated as comprising a "sunflower" with a circular series of contact plates forming the terminals of several local circuits, and a rotating contact trailer C which connects the main line A with the several local circuits in succession. B is the shaft of the sunflower upon which the rotary contact arm C is mounted and which is operated by a motor D. It is not necessary to enter into details of this multiplex system, since my present invention is independent of such details, and is concerned only with the problem of synchronizing the electro-magnetic devices which require to be worked in synchronism, and which, in this particular example, are the several motors D of the respective instruments along the line A. These motors D in this form of the invention are not included in the line A, but are operated from a wholly separate circuit ($A^2$ of Fig. 2). This entirely relieves line A of the synchronizing duty and so gives to the telegraph service thereon, a gain in speed, or a gain in distance, or a gain in the number of messages that may be simultaneously transmitted.

The motors D may be either included directly in line $A^2$ as shown in Fig. 7 or controlled by a relay included therein and claims hereinafter made which mention a motor are to be considered, unless otherwise stated, as referring equally to a relay controlling a motor, the relay itself being a species of motor. Since the relay method is more generally adaptable, I have shown in Fig. 1 such a relay at E, in line $A^2$, and also its connection with the motor. The relay E is of the polarized type responding to the alternating currents in line $A^2$ and its tongue $a$, connected to one terminal of motor D, vibrates between contacts 1 and 2 connected respectively to a terminal of one of the condensers $F^1$ and $F^2$ which are charged by the generator G. The opposite condenser terminals are both connected to the other terminal of motor D by the wire $f$, so that one condenser or the other will discharge into the motor according as the tongue $a$ is in contact with point 1 or point 2; if the former, condenser $F^1$ will discharge, or if the latter, condenser $F^2$ will discharge, the idle condenser in the meanwhile receiving its charge from generator G. Resistances to reduce the spark and control the amount of current will be placed around the contacts 1 and 2. By this means, a series of alternating impulses will be delivered to motor D, synchronous with the vibrations of the relay E and these impulses will give a corresponding rate of rotation to the motor and the apparatus driven thereby. This particular method of relay control of motor D is not claimed by me and is merely shown to complete the illustration. Any other equivalent arrangement may be substituted therefor.

Turning next to Fig. 2, wherein is illustrated an elementary form of my synchronizing devices, $A^2$ is an ordinary telegraph line operated on the single Morse system without any of the usual multiplex appliances therefor. In this line I superpose on the Morse currents and apparatus, an alternating current which will not interfere with the Morse system, but will work simultaneously therewith and give to the motors D, or relays E, therein an action synchronous with its rate of alternations. The alternating generator in line $A^2$ may be located at any desired point, preferably near the center when the line is very long, but for illustration I have shown it included at $G^2$ in the station at the right of the figure in Fig. 2, while the synchronizing receiving apparatus is indicated in the station on the left of the same figure. It will be manifest that no synchronizing receiver is required at the station where the generator $G^2$ is located, since the shaft B of the sunflower, may at that station be mechanically connected to the shaft of the generator, and so move synchronously therewith, or may be operated from the generator by a synchronous motor. The Morse apparatus in Fig. 2 is indicated by the battery H (connected on one side to the ground K) and key J (connected to the other terminal of battery H) and the relay I (connected between key J and line wire $A^2$). This apparatus will work in the ordinary fashion, the battery, key and relay being all in series with each other and with the line $A^2$. A similar set of apparatus is shown at the opposite station. The synchronizing relay E, which, as already noted, may in some cases be replaced by the motor D itself, is shown as included in the line $A^2$, but shunted by an inductive resistance $R^1$, and in series with condenser $C^1$. By this arrangement the alternating current coming uninterruptedly from generator $G^2$ at a specified frequency, will be diverted by the coil $R^1$ into the branch containing the relay E and condenser $C^1$. In the latter branch the capacity of the condenser will, at a predetermined frequency, neutralize the inductance of the relay so that the impedance of the branch, will be small as compared with that of the other branch. The Morse current, on the other hand, will pass through the branch containing coil $R^1$ which, to such current, presents little resistance and can not pass through the relay branch because of the condenser $C^1$. If desired, an inductance coil may be included in series with the Morse relay, as at $R^{10}$ Fig. 2 at the right hand station, which will supplement the inductance of the relay and aid in preventing the alternating current from affecting the relay. Likewise, after passing the relay, the alternating current will go to ground K through the wire $a^2$, which contains a condenser $C^3$ that serves to shut off the Morse currents, the capacity of the condenser being preferably balanced by the inductance coil $R^3$. The alternating current may also go to ground (when key J is closed) through the condenser and inductance coil $C^2$ and $R^2$. The Morse current, however, can not pass through either of these condenser branches and so goes directly to relay I, to key J, to battery H, to ground K. Thus there are two ground connections between the motor and the ground, including a condenser and serving for the alternating current only and the other being the normal ground of the telegraphic apparatus. In this manner the respective currents will be separated out and diverted to their respective receiving instruments independently of each other. The synchronizing devices will thus have a circuit that always remains, for them, intact and the alternating current will flow without interruption, exerting its synchronizing and operating effect upon the sunflowers C of the multiplex line A; the Morse current will flow over its particular circuit according to the manipulation of the keys J and operate the local instruments just as if the alternating current were not there. This illustration shows the character of my present invention, it being noted that while I have mentioned a Morse circuit as the one to be utilized for transmitting the synchronizing impulses, yet it will be understood that any other line having currents and apparatus capable of differentiation from the synchronizing current may be utilized therefor in like manner, while, as I will show hereinafter they may be applied to line A itself.

I should mention that in the plan of Fig. 2 the condenser and inductance coil $C^2$ and $R^2$ may shunt the key J as in Fig. 3 or the battery and key as in Fig. 4. In that case the Morse relay I will be substituted for the inductance coil $R^1$ in the branch around synchronizing relay E and its condenser $C^1$ as appears in Fig. 3. Moreover, as in Fig. 5, the coil and condenser $R^2$ and $C^2$ may be omitted and an inductance coil $R^4$ placed in series in the Morse relay branch. Also, as in Fig. 6, the coil and condenser $R^3$ and $C^3$ may be omitted, and the key J may, through transmitter $J^1$, send currents of differing polarity to the line from batteries H and $H^1$ alternately. Again, for a way station on line $A^2$ the arrangement may be as in Fig. 7, which will be readily understood from the foregoing description, it being merely noted that the motor D is itself substituted in line $A^2$ for the motor-controlling relay E. In this arrangement of Fig. 7 the Morse relay can be substituted for coil $R^4$ as in Fig. 3, provided the motor-relay E is used instead of the motor itself, when the coil and condenser $R^2$ $C^2$ may shunt key J as in Fig. 3, or the key and battery as in Fig. 4, a coil being also included if desired in the circuit so shunted.

It is not necessary that the attained synchronous speed of the apparatus should correspond to the frequency of the alternating current, but may be that of a supplementary synchronizer acting on the alternating current, or if desired on a direct or reversed current flowing over the synchronizing circuit. Thus in Fig. 8, the alternating generator $G^2$ is shown at the left hand station, and, while running continuously its current is admitted to the line periodically, the periods being less frequent than the current alternations. This may be provided for by a continuously running circuit-breaker P in a local circuit including transmitter circuit containing magnet Q, which acts, on each closure, to operate the transmitter $J^5$ controlling the generator $G^2$. In the condition shown, line $A^2$ is connected to ground through the spring $j^2$ and the transmitter-lever, the circuit of $G^2$ being open, but when magnet Q acts, it raises the outer end of the lever away from $j^2$ and against $j$. This connects the generator to line periodically, the periods being determined by the rate of rotation of circuit-breaker P. When the current is flowing, the armature of relay E, at the opposite end of the line, vibrates, making such poor contact with its stops that the circuit of magnet $E^2$, controlled by the relay, is practically open and the magnet inert. This allows the magnet armature to vibrate, not coincidently with the alternating impulses, but coincidently with the makes and breaks of circuit breaker P. The magnet $E^2$ controls motor D, as in Fig. 1 it is controlled by relay E itself. The motor D is operated by the direct-current generator G and condensers F $F^1$ in the manner described at length in connection with said Fig. 1. I have shown in this Fig. 8 none of the other apparatus except the key J and battery H with an intervening inductance coil.

I will next describe the application of my synchronizing apparatus to a Morse circuit that is duplexed or quadruplexed by the ordinary means.

Referring to Fig. 9 which shows a duplex system, $I^1$ is an ordinary differential relay, one side of which is in the line $A^2$ and the other in the artificial line L. The synchronizing relay E has one of its coils connected in a shunt around one half of Morse relay $I^1$ and its other coil in a second shunt around the other half, a condenser $C^1$ being in series with each coil. The key J and generators H, $H^1$ are shunted by a condenser $C^5$ and a balancing inductance $R^5$. This not only provides a path for the synchronizing current to ground independent of the artificial line and the generators H, $H^1$, but also reduces the abruptness of the impulses from generators H, $H^1$, which must first charge the condenser before charging the line.

It is sometimes the case that the polar relay $I^1$ is not wound suitably to shunt the synchronizing relay E and in that event I employ the arrangement in Fig. 10, wherein each half of relay E is shunted by a separate inductance $R^1$, the two relay coils and their respective inductances being on opposite sides of the circuit. The two sides of relay $I^1$ will in like manner be on the respective sides of the circuit and each will be shunted by a condenser as appears in said Fig. 10.

In Fig. 11, the synchronizing relay E is entirely in the line $A^2$, being in series with condenser $C^1$ and shunted by inductance $R^1$. The two sides of the polar relay $I^1$ are however in the main line $A^2$ and the artificial line L respectively each being shunted by a condenser $C^2$ and an inductance coil $R^2$.

In Fig. 12 I show a quadruplex system, working from each end with reversed Morse currents for one set of messages and with unreversed Morse currents for the other set. $I^2$ and $I^3$ are the respective receiving relays for the Morse currents, wound differentially in the usual manner. $J^2$ is the reversing key and J is the neutral key. L is the artificial line. Each half of the relay $I^3$ is shunted by a coil and condenser $R^2$ $C^2$ as previously described. The synchronizing relay E is wound differently so that the effects of the Morse currents in the respective halves will neutralize each other, and the two halves of the relay are in shunts around the respective sides of relay $I^2$, each being in series with a condenser. The Morse keys and battery are shunted by coil and condenser $R^5$ $C^5$ as before described for Fig. 9. This renders the line intact for the transmission of the continuously operating synchronizing currents, which are shunted around the Morse instruments by the condensers and the capacity of each condenser balanced by a corresponding inductance.

Figs. 13 and 14 represent modifications, or rather variations, in the connections shown in Fig. 12. In Fig. 13 a single shunt bridges one half of both $I^2$ and $I^3$, this shunt containing one coil of relay E and a condenser. The same arrangement is shown in Fig. 14 except that the single shunts contain special coils $R^2$ each with a condenser $C^2$.

In Fig. 15 I show one form of the heretofore mentioned application of the synchronizing impulses directly to line A itself, these impulses being rendered independent of the multiplex transmission by the methods already described. By means of the synchronously operated "sunflowers" C and C at the transmitting and receiving stations respectively, the several keys J operate the several receivers I in a manner that is well known, the line A being connected at the proper moments to each key and its corresponding receiver, and the successive connections being so rapid that in effect each of the four keys may work its receiver as if they two viz., each key and its receiver were the only ones on the line. Each receiver I is shunted by a balanced condenser $C^2$ and the motor relay E, in series with its condenser $C^1$, is contained in the main line A and shunted by inductance coil $R^1$. There is also the line $a^2$ leading from line $a^1$ to ground K, through condenser $C^3$ and inductance coil $R^3$. The alternating current-generator $G^2$ may be at any convenient point, but is shown at the transmitting end of the line where it may synchronize sunflower C. In this arrangement I so time the frequency of the synchronizing impulses and the dimensions of sunflower C that the brush c will remain on one section of the sunflower while one complete cycle of the alternating current is flowing.

In the following claims I intend to embrace my arrangement of synchronizing devices on a line which also contains telegraphic apparatus, capable of being operated without disturbance from the said devices, irrespective of whether the synchronous apparatus to which the synchronizing devices are applied is upon the same lines or upon a different line. As a specific form of the invention I also make special claim herein to an arrangement wherein the apparatus to which the synchronous devices are applied is on a separate and distinct line as in Figs. 1 and 2. The alternate form shown in Fig. 15 wherein synchronizing devices are applied to apparatus on the same line is shown herein merely to indicate the scope of my invention and will serve as the basis of a separate application for patent. It will also be observed that as regards the particular type of telegraphic apparatus contained in the synchronizing line I make generic claims which are not limited either to a single, a duplex or a quadruplex system, but as a specific matter I make particular claims relating to the arrangement of differential magnets which characterizes both the duplex and quadruplex arrangements.

What I claim as new and desire to secure by Letters Patent is:

1. The combination with synchronous telegraphic apparatus, of synchronous devices therefor comprising a motor responding to alternating currents, a line for said motor including, in addition to the motor, telegraphic apparatus for the transmission and reception of messages and two sources of current, one for the telegraphic apparatus and the other a continuously-operating source of alternating current for operating the motor without disturbing the operation of the said telegraphic apparatus.

2. The combination with synchronous electrical apparatus, of synchronous devices therefor comprising a motor, a controlling relay for the motor responding to alternating currents, a line for said relay including telegraphic apparatus and a separate source of current therefor in addition to the relay, and a continuously operating source of alternating current on said line for operating the relay without disturbing the operation of said telegraphic apparatus.

3. The combination with synchronous electrical apparatus, of synchronous devices therefor comprising a motor responding to alternating currents, a line for said motor, telegraphic apparatus on said line for the transmission and reception of messages, a source of irregular current-impulses for the telegraphic apparatus, and a second source of current consisting of a continuously-operating alternating-current generator for operating the motor without disturbing the operation of the telegraphic apparatus.

4. The combination of a synchronous electrical apparatus, of synchronizing devices therefor comprising a motor responding to alternating currents, a line for said motor containing telegraphic apparatus for the transmission and reception of messages, and two separate sources of current, one a source of irregular current-impulses for operating telegraphic apparatus and the other a continuously-operating source of alternating current together with separate local branches for the two respective kinds of current.

5. The combination with synchronous electrical apparatus, of synchronizing devices therefor comprising a motor responding to alternating currents, a line for said motor including telegraphic apparatus responding to irregular current impulses and a source of current therefor, a continuously operating source of alternating current for said motor, and separate local branches for the telegraphic and the synchronizing currents respectively, the branch for the synchronizing currents containing a condenser and the branch for the telegraphic current containing an inductance device.

6. The combination with synchronous electrical apparatus, of synchronizing devices therefor comprising a motor responding to alternating currents, a line for said motor including telegraphic apparatus shunted by a condenser, a continuously operating source of alternating currents, a source of telegraphic currents, and separate branches between said motor and the ground, one of said branches being provided with a condenser and the other containing the said telegraph apparatus.

7. The combination with synchronous electrical apparatus of synchronizing devices therefor comprising a line, a motor and a condenser included in a branch of said line and shunted by inductance, and a continuously operating source of alternating current on said line, the said line also containing telegraphic apparatus at a point between the said motor and the ground shunted by a second ground connection containing a condenser.

8. The combination with a line and a continuously operated source of alternating current thereon, of a synchronizing motor responding to said alternating current included in the said line in series with a condenser and shunted by an inductance, and two branch circuits between the said motor and the ground, one containing a condenser and the other containing telegraphic apparatus.

9. The combination with a line, of a source of telegraph currents operating irregularly to give telegraphic communication, a continuously operating source of alternating current on the same line, a synchronizing motor responding to the alternating currents and included in the said line in series with the condenser but shunted by inductance, and two ground connections between the said motor and the ground, one containing a condenser and the other containing telegraphic apparatus.

10. The combination with a line, of a source of continuously operating alternating current, a synchronizing motor responding to said current, a source of telegraphic current, telegraphic apparatus having a differentially wound magnet one coil of which is contained in the said line and the other coil in an artificial line, and two circuits between said telegraphic apparatus and the ground, one containing a condenser and serving as a ground for the alternating currents, the other containing the transmitting key of the telegraphic apparatus.

11. The combination with a line of a continuously operating source of alternating current, a synchronizing motor responding thereto and contained in said line in series with the condenser but shunted by an inductance device, telegraphic apparatus having a differential coil, one branch of which is contained in the said line and the other branch in an artificial line, and two ground circuits between the said telegraphic apparatus and the ground, one containing a condenser and serving as a ground for the alternating current and the other containing the transmitting key and a source of telegraphic currents for the said apparatus.

12. The combination with a line, of a source of continuously operating alternating current, a synchronizing motor responding thereto and contained in said line in series with a condenser but shunted by an inductance device, telegraphic apparatus containing a differential coil one branch of which is in said line and the other branch in an artificial line both branches being shunted by a condenser, and two circuit connections between said apparatus and the ground, one containing a condenser and serving as a ground for the alternating current and the other containing a source of telegraphic current and serving as a ground for the telegraphic apparatus.

13. The combination with synchronous electrical apparatus and a line therefor, of synchronizing devices for said apparatus contained in a second parallel line which also contains telegraphic apparatus, the said devices comprising a motor, a continuously operating source of alternating current for said motor, a condenser in series with said motor, an inductive shunt around both motor and condenser, and two ground connections, one a ground for the telegraphic apparatus and the other containing a condenser and serving as a ground for the alternating current.

In witness whereof I have hereunto subscribed my name, before two subscribing witnesses, this 8th day of July 1903.

ALBERT C. CREHORE.

Witnesses:
G. W. HOPKINS,
L. T. SHAW.